(12) United States Patent
Spalding et al.

(10) Patent No.: US 11,977,267 B2
(45) Date of Patent: May 7, 2024

(54) HIGH FIBER COUNT UNDERSEA CABLE

(71) Applicant: SUBCOM, LLC, Eatontown, NJ (US)

(72) Inventors: Marsha Ann Spalding, Hampton, NJ (US); Ralph J. Rue, Barnegat, NJ (US)

(73) Assignee: SubCom, LLC, Eatontown, NJ (US)

( * ) Notice: Subject to any disclaimer, the term of this patent is extended or adjusted under 35 U.S.C. 154(b) by 42 days.

(21) Appl. No.: 17/676,143

(22) Filed: Feb. 19, 2022

(65) Prior Publication Data
US 2022/0283397 A1 Sep. 8, 2022

Related U.S. Application Data

(60) Provisional application No. 63/157,241, filed on Mar. 5, 2021.

(51) Int. Cl.
*G02B 6/44* (2006.01)
*H04B 10/25* (2013.01)

(52) U.S. Cl.
CPC ......... *G02B 6/44384* (2023.05); *H04B 10/25* (2013.01)

(58) Field of Classification Search
None
See application file for complete search history.

(56) References Cited

U.S. PATENT DOCUMENTS

| | | | |
|---|---|---|---|
| 5,751,880 A | 5/1998 | Gaillard | |
| 6,253,012 B1* | 6/2001 | Keller | G02B 6/4436 385/103 |
| 6,349,161 B1* | 2/2002 | Gleason | G02B 6/4427 385/113 |
| 6,496,629 B2* | 12/2002 | Ma | G02B 6/4427 385/113 |
| 6,963,686 B2* | 11/2005 | Moon | G02B 6/4438 385/113 |
| 7,386,208 B2* | 6/2008 | Bosisio | G02B 6/44384 385/102 |
| 7,536,071 B2* | 5/2009 | Pavan | G02B 6/4494 385/103 |
| 7,995,886 B2* | 8/2011 | Pizzorno | G02B 6/4494 385/100 |
| 11,175,471 B2* | 11/2021 | Murthy | G02B 6/4403 |
| 2004/0197059 A1* | 10/2004 | Castellani | C08L 23/14 385/112 |

(Continued)

FOREIGN PATENT DOCUMENTS

| | | |
|---|---|---|
| CN | 111856676 A | 10/2020 |
| WO | 2021003805 A1 | 1/2021 |

OTHER PUBLICATIONS

EP Search Report dated Jul. 15, 2022, for the EP Patent Application No. 22159525.9 filed on Mar. 22, 2022, 7 pages.

*Primary Examiner* — Rhonda S Peace
(74) *Attorney, Agent, or Firm* — KDW Firm PLLC

(57) ABSTRACT

Disclosed are approaches for forming a semiconductor device. In some embodiments, a method may include providing a patterned hardmask over a substrate, and providing, from an ion source, a plasma treatment to a first section of the patterned hardmask, wherein a second section of the patterned hardmask does not receive the plasma treatment. The method may further include etching the substrate to form a plurality of fins in the substrate, wherein the first section of the patterned hardmask is etched faster than the second section of the patterned hardmask.

16 Claims, 3 Drawing Sheets

(56) References Cited

U.S. PATENT DOCUMENTS

| | | | |
|---|---|---|---|
| 2004/0240811 A1* | 12/2004 | Weiss | G02B 6/4429 |
| | | | 385/113 |
| 2009/0297106 A1 | 12/2009 | Pizzorno et al. | |
| 2016/0359554 A1* | 12/2016 | Hibino | H04B 10/0771 |
| 2022/0283397 A1* | 9/2022 | Spalding | G02B 6/4494 |

* cited by examiner

300

HIGH FIBER COUNT UNDERSEA CABLE

RELATED APPLICATION

This application claims priority to U.S. provisional patent application Ser. No. 63/157,241, filed on Mar. 5, 2021, entitled "High Fiber Count Undersea Cable," which is incorporated herein by reference in its entirety.

BACKGROUND OF THE INVENTION

Field of the Invention

Embodiments of the present disclosure relate to the field of optical communication systems. More particularly, the present disclosure relates to an improved undersea optical fiber communications cable configured to support or include a higher count of optical fibers than the fiber count of conventional or existing undersea cables.

Discussion of Related Art

Communication systems employing optical fibers as the transmission medium have become widespread because of their wide bandwidth, relatively low optical loss, and the development of optical amplifiers that do not require conversion of the optical signal into the electrical domain for amplification. Because of the fragility of optical fibers, which may have diameters as small as 250 microns, the fibers may be physically protected from external forces by a cable.

The construction and design of the cable may differ depending on the particular application for which the optical cable is to be used. For example, in a loose tube structure, several gel-filled buffer tubes containing optical fibers may be arranged around a central strength member. In a monotube structure, all of the optical fibers may be disposed in a single centrally located gel filled buffer tube. The different cable structures or designs may incorporate additional protection, such as support members, power connectors, plastic electrical insulation, corrugated armor, protective metallic sheaths, plastic jackets and armor wires.

One important component of the optical cable may be the support members, which support most of the tension that is applied to the cable during its installation and subsequent operation. The support members may be arranged in a number of configurations. For example, two strength members may be employed, which can be embedded in an outer jacket and located 180 degrees apart from one another. Other configurations may employ a concentric series of support members uniformly distributed over 360 degrees. These configurations may often be employed in terrestrial applications.

In designing a cable for undersea use, it may be necessary to overcome a number of environmental factors, such as low temperature, high compressive hydrostatic pressure, corrosive effects of seawater, etc. Additionally, undersea cables must be able to withstand large tensile and bending stresses encountered during cable laying and recovery operations. Thus, undersea cables in subsea applications typically require additional strength members in comparison to terrestrial cables. For these applications one or more layers of support members are disposed in a close packed arrangement surrounding the buffer tube.

In the loose tube and monotube designs, the buffer tube may be the primary structure protecting the optical fibers. Thus, the buffer tube may be made from a material having a high Young's modulus. The use of a material with a high Young's modulus may result in a cable with a buffer tube having relatively high tensile and compressive resistance capability, which are characteristics that are useful in protecting the optical fibers in the event the cable is twisted, stretched or compressed. It is also important to select a material for the buffer tube that has a low thermal expansion coefficient since too much shrinkage or expansion of the buffer tube caused by temperature changes could place tensile or compressive loads on the optical fibers, which may result in damaged or broken optical fibers.

Submarine-based communication systems have often employed metallic buffer tubes fabricated from materials such as stainless steel or aluminum, however metal buffer tubes are more expensive than plastic buffer tubes and increase the complexity of manufacturing.

Further, with increasing bandwidth demands on communication systems, there is a need for a cable to support or include higher and higher optical fiber counts. However, conventional or existing cable designs typically support a maximum of 24 fibers or less.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one approach, an optical cable may include a hollow buffer tube having a plurality of optical fibers therein and a water-blockable buffering gel disposed in the hollow buffer tube, wherein the hollow buffer tube is made from a plastic material and has a wall thickness less than 0.38 millimeters (mm). The water-blockable buffering gel may have a viscosity of less than 23,000 centipoise (cps).

In another approach, an optical communication system may include a set of terminals and a pair of unidirectional optical paths, wherein each unidirectional optical path of the pair of unidirectional optical paths comprises an optical cable. The optical cable may include a hollow buffer tube having a plurality of optical fibers therein, and a water-blockable buffering gel disposed in the hollow buffer tube, wherein the hollow buffer tube is made from a plastic material and has a wall thickness less than 0.38 millimeters (mm), and wherein the water-blockable buffering gel has a viscosity of less than 23,000 centipoise (cps).

In yet another approach, an underwater optical cable may include a hollow buffer tube having a plurality of optical fibers therein, and a water-blockable buffering gel disposed about the plurality of optical fibers within the hollow buffer tube, wherein the hollow buffer tube is made from a plastic material and has a wall thickness less than 0.38 millimeters (mm). The water-blockable buffering gel may have a viscosity of less than 23,000 centipoise (cps).

BRIEF DESCRIPTION OF THE DRAWINGS

By way of example, embodiments of the disclosure will now be described, with reference to the accompanying drawings, in which.

Figure 1:
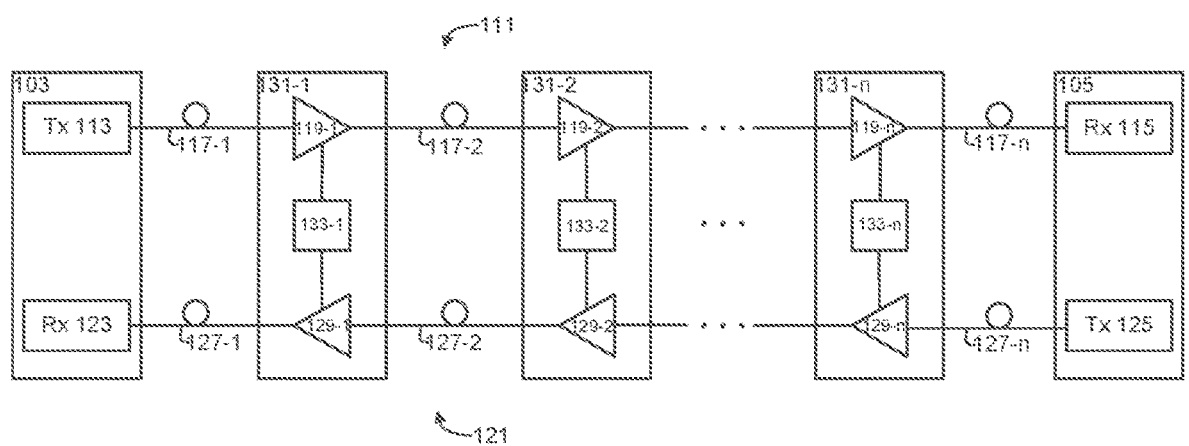
FIG. 1 illustrates an example optical communication system according to embodiments of the present disclosure.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present invention is directed to at least an improved undersea optical fiber communications cable configured to support or include a higher count of optical fibers (otherwise referred to herein at "fiber count") than the fiber count of conventional or existing undersea cables. According to embodiments, the improved cable includes at least a hollow buffer tube having a predefined thickness and water-blockable gel disposed in the buffer tube. In examples, the hollow buffer tube may be formed or manufactured from plastic material.

As will be further described in detail below, the improved undersea optical cable is configured to support or include at least 48 fibers by at least decreasing the wall thickness of the tube and reducing the viscosity of the gel. One of the numerous advantages of such a configuration and the examples and embodiments described herein is that the improved cable can support a high fiber count without compromising performance of the cable.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to the drawings, FIG. 1 illustrates an exemplary bi-directional optical communication system 101 which may use high-bandwidth fiber optics to transmit vast amounts of data over long distances. Bi-directional data transmission may be implemented by constructing pairs of optical fibers within the optical cable and transmitting one or more channels, e.g., wavelength division multiplexed channels, per fiber pair.

As shown, the optical communication system 101 may include terminals 103 and 105 connected by two unidirectional optical paths 111, 121, which together form a bi-directional optical fiber pair. Optical path 111 may transmit information in one direction (e.g., to the right) from a transmitter 113 at terminal 103 to a receiver 115 at terminal 305. Optical path 121 may transmit information in the other direction (e.g., to the left) from a transmitter 125 at terminal 105 to a receiver 123 at terminal 103. With respect to terminal 103, the optical path 111 is an outbound path and the optical path 121 is an inbound path. The optical path 111 may include optical fibers 117-1 to 117-$n$ and optical amplifiers 119-1 to 119-$n$, and the optical path 121 may include optical fibers 127-1 to 127-$n$ and optical amplifiers 129-1 to 129-$n$. The one or more of the optical amplifiers 119-1 to 119-$n$ and 129-1 to 129-$n$ may be EDFAs. It may be understood that, in some examples, transmitter 113 and receiver 123 may be housed together as a transponder at terminal 103, and similarly, transmitter 115 and receiver 125 may also be housed together as a transponder at terminal 105.

The optical path pair (e.g., optical paths 111, 121) may be configured as a set of amplifier pairs 119-1 to 119-$n$ and 129-1 to 129-$n$ within repeaters 131-1 to 131-$n$ connected by pairs of optical fibers 117-1 to 117-$n$ and 127-1 to 127-$n$, which may be included in an optical fiber cable together with fibers supporting additional path pairs. Each repeater 131 may include a pair of amplifiers 119, 129 for each path pair and may include additional amplifiers for additional path pairs. The optical amplifiers 119, 129 may utilize EDFAs or other rare earth doped fiber amplifiers, Raman amplifiers, or semiconductor optical amplifiers (SOAs). A coupling path 133-1 to 133-$n$ may be coupled between optical paths 111, 121, for example, in one or more of the repeaters 131-1 to 131-$n$. It may be understood that the term "couple" or "coupled," as used herein, broadly refers to any connection, connecting, coupling, link, or linking, either a direct or indirect or a wired or wireless connection and does not necessarily imply that the coupled components or elements are directly connected to each other.

Although an exemplary embodiment of the optical communication system 101 is shown and described, variations of the optical communication system 101 are within the scope of the present disclosure. The optical communication system 101 may include, for example, more optical path pairs and more or fewer repeaters. Alternatively, the optical communication system 101 may not include any optical amplifiers or may include, instead of optical amplifiers, optical pump power sources suitable for implementing optical gain by Raman amplification within optical fibers connecting repeaters.

Moreover, it may be understood that the transmitters, receivers, transponders containing the transmitters and receivers, or any other suitable device for transmitting and receiving data, may be include at least one memory and one or more processors (e.g., CPU, ASIC, FGPA, any conventional processor, etc.) to execute instructions stored in memory.

It may further be understood that the above-described optical paths may be powered via power conductor(s) of the optical cables. Moreover, multiple optical communication systems, such as optical communication system 101, may be interconnected via interconnect cables and branching units.

Figure 2:
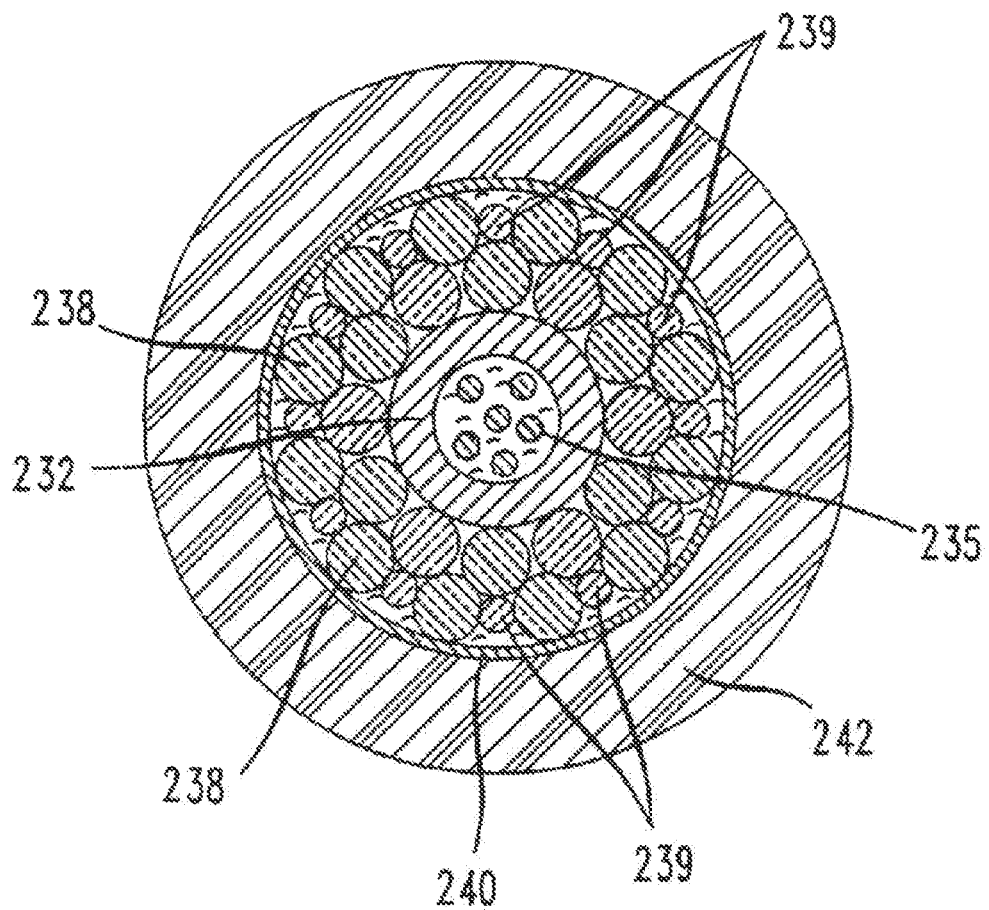
FIG. 2 illustrates a conventional undersea cable.

FIG. 2 illustrates an example of a conventional or existing undersea optical cable employed in undersea applications. As shown, a tube 232 may enclose or include optical fibers 235. The tube 232 may be a single, centrally located gel-filled buffer tube made from plastic material. Typically, the plastic tube 232 of a conventional undersea cable has a wall thickness of 0.38 mm. The gel in the tube 232 may be a thixotropic gel and may have a specific conventional viscosity, e.g., 23,000 centipoise (cps).

As further shown, two layers of strength members may be wound around the plastic tube 232. One layer may include strength members 238 and the other layer may include strength members 239. For example, the strength members have a circular cross-section and each layer of the strength members may be arranged in a close-packed configuration, e.g., the inner layer may comprise eight strength members in which adjacent members are in contact with one another. Similarly, the outer layer may comprise 16 strength members in which adjacent members are in contact with one another.

Moreover, a conductor 240 (e.g., a copper conductor) may surround the strength members and may serve as both an electrical conductor and a hermetic barrier. Further illustrated is an outer jacket 242 that is formed from polyethylene and may encapsulate the conductor 240. For example, the outer jacket 242 may serve as an insulating layer. Further, it may be understood that undersea cables can typically withstand a tensile load of 20,000 pounds whereas terrestrial cables can typically withstand a tensile load of only 600 pounds due to, for instance, the different arrangement of the strength members used in the terrestrial and undersea cables.

Figure 3:
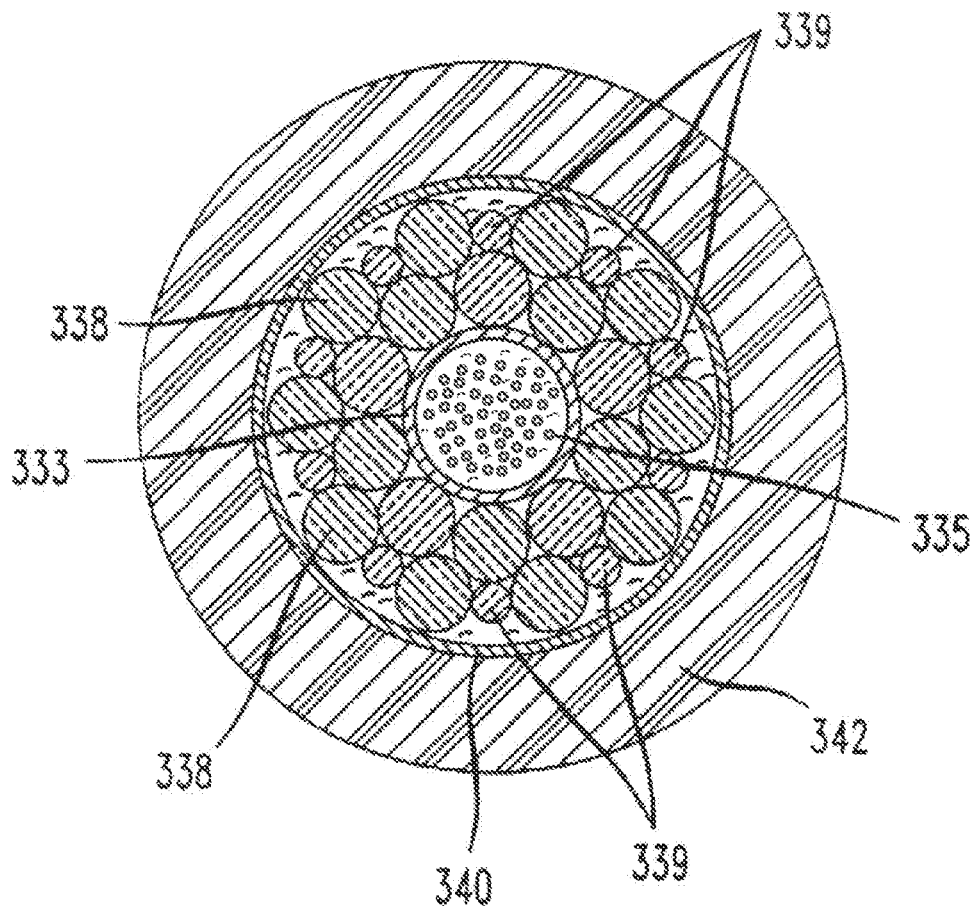
FIG. 3 illustrates an exemplary high fiber count undersea cable according to embodiments of the present disclosure.

FIG. 3 illustrates an exemplary high fiber count undersea cable 300 according to one or more embodiments of the present disclosure. As shown, the cable 300 may include at least a tube 333, optical fibers 335, thixotropic or water-blockable gel, layered strength members 338, 339, a conductor 340, and an outer jacket 342. The water-blockable gel and the optical fibers 335 may be contained or included in or enclosed by the tube 333.

In examples, the tube 333, which may be a single, centrally disposed buffer tube may be formed by or made or manufactured from plastic material, e.g., polybutylene terephthalate (PBT). It is understood that buffer tubes made from plastic have various and numerous advantages over the use of metallic buffer tubes, such as significantly reducing both the material cost and the complexity of manufacture.

As illustrated in FIG. 3, the improved high fiber count undersea cable 300 is configured to include, support, enclose, accommodate, etc. at least 48 individual or separate optical fibers 335, which is a significantly higher fiber count than the typical fiber count of conventional or existing undersea cables, such as the one illustrated in FIG. 2.

In embodiments, the cable 300 may be configured to have a higher fiber count by at least decreasing or reducing the wall thickness or wall width of the tube 333, as shown by the decreased cross-sectional wall thickness or wall width of the tube 333 compared to the wall thickness of tube 232 of the conventional or existing undersea cable of FIG. 2.

For example, using the above-described conventional cable as reference, the wall thickness or wall width of tube 333 may be configured, formed, manufactured, arranged, etc. to be approximately 50 to 75% of the typical tube wall thickness. In one embodiment, for instance, the wall thickness or wall width of tube 333 may be approximately 60 to 65% of the typical tube wall thickness, preferably 63%. In another embodiment, more particularly, with a thinner conventional cross-sectional wall thickness, the wall thickness or wall width of tube 333 may be approximately 70 to 75% of the typical tube wall thickness, preferably 71%. The wall thickness decrease of tube 333 from conventional thickness (es) may be any suitable range that allows higher fiber count in the improved cable 300 without compromising cable or system performance. Thus, for instance, the wall thickness of tube 333 may simply be any thickness less than the conventional or typical thickness(es).

Moreover, the improved cable 300 may be configured to have a higher fiber count by at least decreasing or reducing the viscosity of the gel in the tube 333. For example, the improved viscosity of the gel may be approximately 55 to 70% of the typical viscosity of the gel found in conventional cables. In one embodiment, for example, the improved gel viscosity may be approximately 61% of the typical or conventional viscosity. Although non-limiting, the viscosity of the gel may be less than 23,000 centipoise (cps). In some embodiments, the viscosity of the gel may be less than 18,000 cps. In some embodiments, the viscosity of the gel may be less than 15,000 cps. It may be understood that the decrease or reduction in viscosity relative to conventional gel may be any suitable range that allows higher fiber count in the cable 300 without compromising cable or system performance. It may further be understood that the improved viscosity of the gel may be anything less than conventional or typical.

The present invention and techniques, examples, and/or embodiments related thereto advantageously provide a much higher fiber count (e.g., at least 48 separate optical fibers) for undersea optical cables than existing or conventional cables (e.g., maximum 24 separate optical fibers). By at least configuring or adjusting the improved high fiber count undersea cable to have a reduced tube wall thickness and a reduced gel viscosity, higher and higher fiber counts in the improved cable can be achieved without at least compromising the performance of the improved cable or the communication system. Another advantage is that such adjustments may utilize already existing cable manufacturing processes or systems, which may greatly reduce any added manufacturing related costs.

Herein, novel and inventive techniques for an improved undersea optical fiber communications cable configured to support or include a higher optical fiber count than the fiber count of conventional or existing undersea cables are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical cable comprising:
   a hollow buffer tube having a plurality of optical fibers therein, wherein the plurality of optical fibers comprises greater than twenty-four optical fibers;
   a water-blockable buffering gel disposed in the hollow buffer tube, wherein the hollow buffer tube is made from a plastic material and has a wall thickness less than 0.38 millimeters (mm), and wherein the water-blockable buffering gel has a viscosity of less than 23,000 centipoise (cps); and
   a plurality of layered strength members surrounding the hollow buffer tube, wherein a total number of the plurality of optical fibers is greater than a total number of the plurality of layered strength members.

2. The optical cable of claim 1, wherein the plurality of optical fibers comprises forty-eight optical fibers.

3. The optical cable of claim 1, further comprising:
   a first plurality of layered strength members of the plurality of layered strength members surrounding the hollow buffer tube;
   a conductor surrounding the first plurality of layered strength members; and
   an outer jacket surrounding the conductor.

4. The optical cable of claim 3, further comprising a second plurality of layered strength members of the plurality of layered strength members surrounding the hollow buffer tube, wherein each of the first plurality of strength members has a first diameter, and wherein each of the second plurality of strength members has a second diameter, different than the first diameter.

5. The optical cable of claim 3, wherein the conductor is directly adjacent the outer jacket.

6. The optical cable of claim 1, wherein the water-blockable buffering gel surrounds the plurality of optical fibers.

7. An optical communication system comprising:
   a set of terminals; and
   a pair of unidirectional optical paths, wherein each unidirectional optical path of the pair of unidirectional optical paths comprises an optical cable, and wherein the optical cable comprises:
   a hollow buffer tube having a plurality of optical fibers therein, wherein the plurality of optical fibers comprises greater than twenty-four optical fibers;
   a water-blockable buffering gel disposed in the hollow buffer tube, wherein the hollow buffer tube is made from a plastic material and has a wall thickness less than 0.38 millimeters (mm), and wherein the water-blockable buffering gel has a viscosity of less than 23,000 centipoise (cps); and
   a plurality of layered strength members surrounding the hollow buffer tube, wherein a total number of the plurality of optical fibers is greater than a total number of the plurality of layered strength members.

8. The optical communication system of claim 7, wherein the plurality of optical fibers comprises between twenty-five and forty-eight optical fibers.

9. The optical communication system of claim 7, wherein the optical cable further comprises:
   a first plurality of layered strength members of the plurality of layered strength members surrounding the hollow buffer tube;
   a conductor surrounding the first plurality of layered strength members; and
   an outer jacket surrounding the conductor.

10. The optical communication system of claim 9, wherein the optical cable further comprises a second plurality of layered strength members of the plurality of layered strength members surrounding the hollow buffer tube, wherein each of the first plurality of strength members has a first diameter, and wherein each of the second plurality of strength members has a second diameter, different than the first diameter.

11. The optical communication system of claim 9, wherein the conductor is directly adjacent the outer jacket.

12. The optical communication system of claim 7, wherein the water-blockable buffering gel surrounds the plurality of optical fibers.

13. An undersea optical cable:
   a hollow buffer tube having a plurality of optical fibers therein, wherein the plurality of optical fibers comprises between twenty-five optical fibers and forty-eight optical fibers;
   a water-blockable buffering gel disposed about the plurality of optical fibers within the hollow buffer tube, wherein the hollow buffer tube is made from a plastic material and has a wall thickness less than 0.38 millimeters (mm), and wherein the water-blockable buffering gel has a viscosity of less than 23,000 centipoise (cps); and
   a plurality of layered strength members surrounding the hollow buffer tube, wherein a total number of the plurality of optical fibers is greater than a total number of the plurality of layered strength members.

14. The undersea optical cable of claim 13, further comprising:
   a first plurality of layered strength members of the plurality of layered strength members surrounding the hollow buffer tube;
   a conductor surrounding the first plurality of layered strength members; and
   an outer jacket surrounding the conductor.

15. The undersea optical cable of claim 14, further comprising a second plurality of layered strength members of the plurality of layered strength members surrounding the hollow buffer tube, wherein each of the first plurality of strength members has a first diameter, and wherein each of the second plurality of strength members has a second diameter, different than the first diameter.

16. The undersea optical cable of claim 14, wherein the water-blockable buffering gel is in direct contact with the hollow buffer tube, wherein the plurality of optical fibers are in direct contact with the water-blockable buffering gel, wherein the first and second plurality of layered strength members are in direct contact with hollow buffer tube and the conductor, and wherein the conductor is in direct contact with the outer jacket.

\* \* \* \* \*